US006716924B2

(12) United States Patent
Tsutsui et al.

(10) Patent No.: US 6,716,924 B2
(45) Date of Patent: Apr. 6, 2004

(54) PROCESS FOR PREPARING ETHYLENE POLYMER COMPOSITION, PARTICLES OF ETHYLENE POLYMER COMPOSITION, AND FILM OBTAINED FROM THE PARTICLES OF ETHYLENE POLYMER COMPOSITION

(75) Inventors: Toshiyuki Tsutsui, Yamaguchi (JP); Tsuneo Yashiki, Yamaguchi (JP); Yasuo Funabara, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/126,751

(22) Filed: Apr. 22, 2002

(65) Prior Publication Data

US 2003/0055174 A1 Mar. 20, 2003

(30) Foreign Application Priority Data

Apr. 23, 2001 (JP) ........................................ 2001-124732

(51) Int. Cl.$^7$ .......................... C08L 23/00; C08L 23/04; C08F 8/00
(52) U.S. Cl. ...................... 525/193; 525/195; 525/240
(58) Field of Search ................ 525/193, 195, 525/240

(56) References Cited

U.S. PATENT DOCUMENTS 4,550,143 A * 10/1985 Tanaka et al. ............... 525/240
5,519,091 A * 5/1996 Tsutsui et al. ............... 525/240

FOREIGN PATENT DOCUMENTS

JP 9-328514 12/1997
JP 10-53612 2/1998

OTHER PUBLICATIONS

Kirsten Folting et al. ; Polyhedron, vol. 10, No. 14, pp. 1639–1646, 1991.

* cited by examiner

*Primary Examiner*—Nathan M. Nutter
(74) *Attorney, Agent, or Firm*—Birch, Stewart, Kolasch & Birch, LLP

(57) ABSTRACT

A process for preparing an ethylene polymer composition comprises a step (I) to prepare an ethylene (co)polymer (i) having [η] of at least 1.5 times the intrinsic viscosity of a (co)polymer (ii) and a step (II) to prepare an ethylene (co)polymer (ii) having [η] of 0.3 to 3 dl/g, said steps (I) and (II) using a catalyst containing a component obtained by contacting a liquid Mg compound with a liquid Ti compound in the presence of an organosilicon compound, wherein the step (II) is carried out in the presence of the polymer (i) or the step (I) is carried out in the presence of the polymer (ii), to prepare an ethylene polymer composition having [η] of 1 to 6 dl/g and a density of not less than 0.94 g/cm$^3$. According to the invention, an ethylene polymer composition (particles) having excellent particle morphology, scarcely suffering sintering and having excellent moldability, a process for efficiently preparing the particles of ethylene polymer composition, and a film having small gauge-variation and excellent tear strength can be provided.

4 Claims, No Drawings

US 6,716,924 B2

PROCESS FOR PREPARING ETHYLENE POLYMER COMPOSITION, PARTICLES OF ETHYLENE POLYMER COMPOSITION, AND FILM OBTAINED FROM THE PARTICLES OF ETHYLENE POLYMER COMPOSITION

FIELD OF THE INVENTION

The present invention relates to a process for preparing an ethylene polymer composition, particles of ethylene polymer composition and a film obtained from the particles of ethylene polymer composition. More particularly, the invention relates to a process for preparing an ethylene polymer composition of excellent particle morphology, which comprises polymerizing ethylene with high activity through two-step polymerization using a specific catalyst, particles of ethylene polymer composition which have excellent particle morphology, scarcely suffer sintering and are capable of efficiently undergoing subsequent processes, and a film obtained from the particles of ethylene polymer composition and having small gauge-variation and excellent tear strength.

BACKGROUND OF THE INVENTION

Ethylene polymers, such as homopolyethylene, a linear low-density ethylene polymer (LLDPE) and an ethylene α-olefin copolymer, are excellent in transparency, mechanical strength, etc., and hence they have been widely used for films and the like.

For preparing such ethylene polymers, various processes have been heretofore known, and it is known that the ethylene polymers can be prepared with high polymerization activity by the use of, as a polymerization catalyst, a Ziegler catalyst containing a titanium catalyst component composed of titanium, magnesium, a halogen, and optionally, an electron donor. It is also known that especially when a solid titanium catalyst component obtained from a halogen-containing magnesium compound that is prepared as a liquid compound, a liquid titanium compound and an electron donor is used as the titanium catalyst component, the ethylene polymers can be prepared with high activity.

By the way, if it becomes possible to polymerize ethylene and an α-olefin with much higher activity in the preparation of the ethylene polymers, not only the productivity is enhanced, but also the amount of a catalyst residue based on the polymer, particularly the amount of halogen, is decreased, and hence problems, such as mold rusting in the molding process, can be solved. On this account, a process for preparing an ethylene polymer, in which ethylene and an α-olefin can be polymerized with much higher activity, has been desired.

As a process for polymerizing ethylene with high activity, there has been recently proposed, for example, a process wherein an ethylene polymerization catalyst containing a solid titanium catalyst component obtained by contacting a liquid magnesium compound, a liquid titanium compound and an organosilicon compound having no active hydrogen (Japanese Patent Laid-Open Publication No. 328514/1997) or a process wherein an olefin polymerization catalyst containing an aluminum compound selected from a reaction product of aluminosiloxane, aluminum alkyl and calixarene and a reaction product of aluminum alkyl and cyclodextrin, a halogen-containing magnesium compound and a titanium compound (Japanese Patent Laid-Open Publication No. 53612/1998), and preparation of polymers of excellent particle morphology using these catalysts has been proposed.

Under such circumstances, establishment of a process for more efficiently preparing an ethylene polymer industrially has been strongly desired. Immediately after the polymerization, an ethylene polymer is usually obtained in the form of a powder irrespective of the polymerization type such as slurry polymerization or gas phase polymerization, and it is desirable to prepare an ethylene polymer having excellent fluidity, containing no finely powdered particles and having excellent particle morphology, namely, an ethylene polymer having a narrow particle size distribution. The ethylene polymer having excellent particle morphology has various advantages such as an advantage that it can be used as it is without pelletization, depending upon the purpose. In addition, development of an ethylene polymer scarcely having tackiness at high temperatures, that is, scarcely suffering sintering, has been strongly desired.

OBJECT OF THE INVENTION

The present invention has been made under such circumstances as described above, and it is an object of the invention to provide a process for preparing an ethylene polymer composition in which ethylene and an α-olefin can be polymerized with high activity and an ethylene polymer composition having excellent particle morphology, scarcely suffering sintering and having excellent moldability can be efficiently prepared. It is another object of the invention to provide particles of ethylene polymer composition which have excellent moldability, scarcely suffer sintering and have a small particle size distribution and to provide a film obtained from the particles of ethylene polymer composition and having small gauge-variation and excellent tear strength.

SUMMARY OF THE INVENTION

The process for preparing an ethylene polymer composition according to the invention is a process comprising:
(I) a step of polymerizing ethylene or ethylene and another α-olefin to prepare an ethylene polymer (i) having an α-olefin content of not more than 30% by weight and an intrinsic viscosity [η] of at least 1.5 times the intrinsic viscosity of the following ethylene polymer (ii) and ranging from 1 to 12 dl/g, and
(II) a step of polymerizing ethylene or ethylene and another α-olefin to prepare an ethylene polymer (ii) having an α-olefin content of not more than 15% by weight and an intrinsic viscosity [η] of 0.3 to 3 dl/g,
said steps (I) and (II) using an ethylene polymerization catalyst containing a solid titanium catalyst component obtained by contacting (a) a liquid magnesium compound with (b) a liquid titanium compound in the presence of (c) an organosilicon compound or an organosilicon aluminum compound,
wherein the step (II) is carried out in the presence of the ethylene polymer (i) obtained in the step (I) or the step (I) is carried out in the presence of the ethylene polymer (ii) obtained in the step (II), to prepare an ethylene polymer composition having an intrinsic viscosity [η] of 1 to 6 dl/g and a density of not less than 0.94 g/cm$^3$.

In the process for preparing an ethylene polymer composition according to the invention, the step (I) and the step (II) are preferably carried out by slurry polymerization.

The particles of ethylene polymer composition according to the invention are prepared by the above process, comprise an ethylene polymer composition having a melt flow rate, as measured at 190° C. in accordance with ASTM D 1238E, of 0.0001 to 0.5 g/10 min and a molecular weight distribution (Mw/Mn) of 20 to 45, and have:

a particle size distribution index, as determined by the following formula, of 1.1 to 2.0, Particle size distribution index=$\sqrt{\text{Polymer } D_{84}/\text{Polymer } D_{16}}$ wherein Polymer $D_{16}$ is a particle diameter obtained when 16% by weight of the whole particles of ethylene polymer composition can be sieved, and Polymer $D_{84}$ is a particle diameter obtained when 84% by weight of the whole particles of ethylene polymer composition can be sieved, a bulk density of 0.30 to 0.45 g/ml, and a fluidity index of 45 to 90.

When the particles of ethylene polymer composition obtained by the invention are applied to film use, the resulting film has small gauge-variation and excellent tear strength.

The film according to the invention is obtained from the particles of ethylene polymer composition and has small gauge-variation and excellent tear strength.

DETAILED DESCRIPTION OF THE INVENTION

The process for preparing an ethylene polymer composition, the particles of ethylene polymer composition and the film obtained from the particles of ethylene polymer composition according to the invention are described in detail hereinafter.

The meaning of the term "polymerization" used herein is not limited to "homopolymerization" but may comprehend "copolymerization". Also the meaning of the term "polymer" used herein is not limited to "homopolymer" but may comprehend "copolymer".

Process for Preparing Ethylene Polymer Composition

In the process for preparing an ethylene polymer composition according to the invention, an ethylene polymerization catalyst containing a specific solid titanium catalyst component is employed.

(A) Solid Titanium Catalyst Component

The ethylene polymerization catalyst for use in the invention contains a solid titanium catalyst component obtained by contacting (a) a liquid magnesium compound with (b) a liquid titanium compound in the presence of (c) an organosilicon compound or an organosilicon aluminum compound.

The ingredients used for preparing the solid titanium catalyst component are described below.

(a) Liquid Magnesium Compound

The magnesium compound used for preparing the solid titanium catalyst component for use in the invention is a liquid magnesium compound, and when the magnesium compound is solid, it is changed to liquid prior to use. As the magnesium compound, a magnesium compound having reducing ability (a-1) or a magnesium compound having no reducing ability (a-2) is employable.

(a-1) Magnesium Compound Having Reducing Ability

The magnesium compound having reducing ability is, for example, an organomagnesium compound represented by the following formula:

wherein n is a number of $0 \leq n < 2$, R is hydrogen, an alkyl as group of 1 to 20 carbon atoms, an aryl group of 6 to 20 carbon atoms or a cycloalkyl group or 3 to 20 carbon atoms, when n is 0, two of R may the same or different, and X is a halogen.

Examples of the organomagnesium compounds having reducing ability include dialkylmagnesium compounds, such as dimethylmagnesium, diethylmagnesium, dipropylmagnesium, dibutylmagnesium, diamylmagnesium, dihexylmagnesium, didecylmagnesium, octylbutylmagnesium and ethylbutylmagnesium; alkylmagnesium halides, such as ethylmagnesium chloride, propylmagnesium chloride, butylmagnesium chloride, hexylmagnesium chloride and amylmagnesium chloride; alkylmagnesium alkoxides, such as butylethoxymagnesium, ethylbutoxymagnesium and octylbutoxymagnesium; and butylmagnesium hydride.

(a-2) Magnesium Compound Having no Reducing Ability

Examples of the magnesium compounds having no reducing ability include:

magnesium halides, such as magnesium chloride, magnesium bromide, magnesium iodide and magnesium fluoride;

alkoxymagnesium halides, such as methoxymagnesium chloride, ethoxymagnesium chloride, isopropoxymagnesium chloride, butoxymagnesium chloride and octoxymagnesium chloride;

aryloxymagnesium halides, such as phenoxymagnesium chloride and methylphenoxymagnesium chloride;

alkoxymagnesiums, such as ethoxymagnesium, isopropoxymagnesium, butoxymagnesium, n-octoxymagnesium and 2-ethylhexoxymagnesium;

aryloxymagnesiums, such as phenoxymagnesium and dimethylphenoxymagnesium;

carboxylic acid salts of magnesium, such as magnesium laurate and magnesium stearate;

magnesium metal; and magnesium hydrate.

The magnesium compound having no reducing ability (a-2) may be a compound derived from the magnesium compound having reducing ability (a-1) or a compound derived during the preparation of the catalyst component. In order to derive the magnesium compound having no reducing ability (a-2) from the magnesium compound having reducing ability (a-1), the magnesium compound having reducing ability (a-1) has only to be contacted with, for example, a compound having an OH group or a reactive carbon-oxygen bond, such as an alcohol, a ketone, an ester, an ether or a siloxane compound, or a halogen-containing compound, such as a halogen-containing silane compound, a halogen-containing aluminum compound or an acid halide.

In the present invention, the magnesium compound having no reducing ability (a-2) can be derived from the magnesium compound having reducing ability (a-1) using the later-described organosilicon compound or organosilicon aluminum compound (c). In this case, the magnesium compounds can be used in combination of two or more kinds.

The magnesium compound may be a complex salt or a double salt with a compound of a metal other than magnesium, such as aluminum, zinc, boron, beryllium, sodium or potassium, e.g., the later-described organoaluminum compound, or can be used as a mixture with the compound of the above metal.

As the liquid magnesium compound used for preparing the solid titanium catalyst component, a magnesium compound other than those described above is also employable. In the resulting solid titanium catalyst component, however, the magnesium compound is preferably present in the form of a halogen-containing magnesium compound. Therefore, if a magnesium compound containing no halogen is used, it is preferable to contact the magnesium compound with a halogen-containing compound during the course of the preparation.

Of the above compounds, magnesium compounds having no reducing ability (a-2) are preferable, and of these, halogen-containing magnesium compounds are particularly preferable. Above all, magnesium chloride, alkoxymagnesium chloride or aryloxymagnesium chloride is preferably employed.

When the magnesium compound is solid, it can be changed to liquid by the use of an electron donor (d-1) in the invention. Examples of the electron donors (d-1) employable herein include alcohols, carboxylic acids, aldehydes, amines and metallic acid esters.

Examples of the alcohols include aliphatic alcohols, such as methanol, ethanol, propanol, isopropyl alcohol, butanol, pentanol, hexanol, 2-methylpentanol, 2-ethylbutanol, heptanol, 2-ethylhexanol, octanol, decanol, dodecanol, tetradecyl alcohol, octadecyl alcohol, undecenol, oleyl alcohol, stearyl alchol and ethylene glycol; alicyclic alcohols, such as cyclohexanol and methylcyclohexanol; aromatic alcohols, such as benzyl alcohol, methylbenzyl alcohol, isopropylbenzyl alcohol, α-methylbenzyl alcohol, α,α-dimethylbenzyl alcohol, phenylethyl alcohol, cumyl alcohol, phenol, cresol, xylenol, ethylphenol, propylphenol, nonylphenol and naphthol; alkoxy group-containing alcohols, such as n-butyl cellosolve, ethyl cellosolve and 1-butoxy-2-propanol; and halogen-containing alcohols, such as trichloromethanol, trichloroethanol and trichlorohexanol.

Examples of the carboxylic acids preferably used include those of 7 or more carbon atoms, such as caprylic acid, 2-ethylhexanoic acid, nonylic acid and undecylenic acid.

Examples of the aldehydes preferably used include those of 7 or more carbon atoms, such as caprylaldehyde, 2-ethylhexylaldehyde, undecylaldehyde, benzaldehyde, tolualdehyde and naphthaldehyde.

Examples of the amines preferably used include those of 6 or more carbon atoms, such as heptylamine, octylamine, 2-ethylhexylamine, nonylamine, decylamine, undecylamine and laurylamine.

Examples of the metallic acid esters include tetraethoxytitanium, tetra-n-propoxytitanium, tetra-i-propoxytitanium, tetrabutoxytitanium, tetrahexoxytitanium, tetrabutoxyzirconium and tetraethoxyzirconium. In the metallic acid esters, silicic acid esters described later as the organosilicon compounds having no active hydrogen (c-1) are not included.

These electron donors (d-1) may be used in combination of two or more kinds, and may be used in combination with the later-described electron donor (d) other than those described above. Of these, alcohols and metallic acid esters are preferably employed, and alcohols of 6 or more carbon atoms are particularly preferably employed.

When the magnesium compound is changed to liquid by the use of the electron donor (d-1), the electron donor of 6 or more carbon atoms as the electron donor (d-1) is used in an amount of usually not less than about 1 mol, preferably 1 to 40 mol, more preferably 1.5 to 12 mol, based on 1 mol of the magnesium compound. The electron donor of 5 or less carbon atoms as the electron donor (d-1) is used in an amount of usually not less than about 15 mol based on 1 mol of the magnesium compound.

In the contact of the solid magnesium compound with the electron donor (d-1), a hydrocarbon solvent can be employed. Examples of the hydrocarbon solvents include aliphatic hydrocarbons, such as pentane, hexane, heptane, octane, decane, dodecane, tetradecane and kerosine; alicyclic hydrocarbons, such as cyclopentane, methylcyclopentane, cyclohexane, methylcyclohexane, cyclooctane and cyclohexene; aromatic hydrocarbons, such as benzene, toluene, xylene, ethylbenzene, cumene and cymene; and halogenated hydrocarbons, such as carbon tetrachloride, dichloroethane, dichloropropane, trichloroethylene and chlorobenzene.

When an aromatic hydrocarbon is used as the hydrocarbon solvent and an alcohol is used as the electron donor (d-1), the alcohol has only to be used in the amount previously described as the amount of the electron donor of 6 or more carbon atoms irrespective of the type (number of carbon atoms) of the alcohol, whereby the magnesium compound can be dissolved. When an aliphatic hydrocarbon and/or an alicyclic hydrocarbon is used, the alcohol as the electron donor (d-1) is used in the above-mentioned amount according to the number of carbon atoms.

In the present invention, it is preferable to use a liquid magnesium compound (a) prepared by contacting the solid magnesium compound with the electron donor (d-1) in the hydrocarbon solvent. In order to dissolve the solid magnesium compound in the electron donor (d-1), a process comprising contacting the solid magnesium compound with the electron donor (d-1) preferably in the presence of a hydrocarbon solvent and then heating the contact product when needed is generally used. This contact is carried out at a temperature of usually 0 to 300° C., preferably 20 to 180° C., more preferably 50 to 150° C., for a period of about 15 minutes to 15 hours, preferably about 30 minutes to 10 hours.

(b) Liquid Titanium Compound

As the liquid titanium compound, a tetravalent titanium compound is particularly preferably employed. The tetravalent titanium compound is, for example, a compound represented by the following formula:

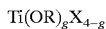

$$Ti(OR)_g X_{4-g}$$

wherein R is a hydrocarbon group, X is a halogen atom, and $0 \leq g \leq 4$.

Examples of such compounds include:

titanium tetrahalides, such as $TiCl_4$, $TiBr_4$ and $TiI_4$;

alkoxytitanium trihalides, such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-iso-C_4H_9)Br_3$;

dialkoxytitanium dihalides, such as $Ti(OCH_3)_2Cl_2$, $Ti(OC_2H_5)_2Cl_2$, $Ti(O-n-C_4H_9)_2Cl_2$ and $Ti(OC_2H_5)_2Br_2$;

trialkoxytitanium monohalides, such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitaniums, such as $Ti(OCH_3)_4$, $Ti(OC_2H_5)_4$, $Ti(O-n-C_4H_9)_4$, $Ti(O-iso-C_4H_9)_4$ and $Ti(O-2-ethylhexyl)_4$.

Of these, titanium tetrahalides are preferable, and titanium tetrachloride is particularly preferable.

These titanium compounds may be used in combination of two or more kinds. The titanium compound may be used after diluted with such a hydrocarbon solvent as previously described for making the magnesium compound liquid.

(c) Organosilicon Compound or Organosilicon Aluminum Compound

In the preparation of the solid titanium catalyst component, an organosilicon compound (c-1) or an organosilicon aluminum compound (c-2) is employed.

(c-1) Organosilicon Compound

As the organosilicon compound (c-1), an organosilicon compound having no active hydrogen is preferably employed, and such a compound is, for example, a compound represented by the following formula:

$$R^1{}_xR^2{}_y\text{Si}(OR^3)_z$$

wherein $R^1$ and $R^2$ are each independently a hydrocarbon group or a halogen, and $R^3$ is a hydrocarbon group.

Examples of the hydrocarbon groups indicated by $R^1$, $R^2$ and $R^3$ include an alkyl group, a cycloalkyl group, an aryl group, an alkylaryl group, an arylalkyl group and an alkenyl group. These groups may be substituted with a halogen or an amino group.

$x$ is a number of $0 \leq x < 2$, $y$ is a number of $0 \leq y < 2$, and $z$ is a number of $0 < z \leq 4$.

Examples of the organosilicon compounds represented by the above formula include tetramethoxysilane, tetraethoxysilane, tetrepropoxysilane, tetrabutoxysilane, tetrakis(2-ethylhexyloxy)silane, ethyltrimethoxysilane, ethyltriethoxysilane, vinyltrimethoxysilane, methyltrimethoxysilane, n-propyltriethoxysilane, decyltrimethoxysilane, cyclopentyltrimethoxysilane, 2-mehylcyclopentyltrimethoxysilane, 2,3-dimethylcyclopentyltrimethoxysilane, cyclohexyltrimethoxysilane, 2-norbornanetrimethoxysilane, 2-norbornanemethyldimethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, decyltriethoxysilane, cyclopentyltriethoxysilane, cyclohexyltriethoxysilane, 2-norbornanetriethoxysilane, phenyltriethoxysilane, γ-aminopropyltriethoxysilane, chlorotriethoxysilane, ethyltriisopropoxysilane, vinyltributoxysilane, trimethylphenoxysilane, methyltriallyloxysilane, vinyltris(β-methoxyethoxy)silane, vinyltriacetoxysilane, dimethyldimethoxysilane, diisopropyldimethoxysilane, t-butylmethyldimethoxysilane, dicyclopentyldimethoxysilane, bis(2-methylcyclopentyl)dimethoxysilane, bis(2,3-dimethylcyclopentyl)dimethoxysilane, dicyclohexyldimethoxysilane, cyclohexylmethyldimethoxysilane, diphenyldimethoxysilane, phenylmethyldimethoxysilane, bis-o-tolyldimethoxysilane, bis-m-tolyldimethoxysilane, bis-p-tolyldimethoxysilane, bis(ethylphenyl)dimethoxysilane, dimethyldiethoxysilane, t-butylmethyldiethoxysilane, t-amylmethyldiethoxysilane, dicyclopentyldiethoxysilane, diphenyldiethoxysilane, bis-p-tolyldiethoxysilane, cyclohexylmethyldiethoxysilane, trimethylmethoxysilane, trimethylethoxysilane, tricyclopentylmethoxysilane, tricylopentylethoxysilane, dicyclopentylmethylmethoxysilane, dicylopentylethylmethoxysilane, hexenyltrimethoxysilane, cyclopentyldimethylmethoxysilane, cyclopentyldiethylmethoxysilane, dicyclopentylmethylethoxysilane and cyclopentyldimethylethoxysilane.

In addition to the organosilicon compounds represented by the above formula, dimethyltetraethoxydisiloxane is also employable as the organosilicon compound (c-1).

Of the above compounds, tetramethoxysilane, tetraethoxysilane, tetrapropoxysilane and cyclohexylmethyldimethoxysilane are preferably used, and from the viewpoint of catalytic activity, tetraethoxysilane is particularly preferably used.

In the present invention, the organosilicon compound (c-1) having no active hydrogen is not necessarily used as such in the preparation of the solid titanium catalyst component, and other compounds capable of producing an organosilicon compound having no active hydrogen during the course of the preparation of the solid titanium catalyst component are also employable.

(c-2) Organosilicon Aluminum Compound

As the organosilicon aluminum compound (c-2), any of an organic compound containing both a silicon and an organic compound containing aluminum is employable. In the present invention, however, an aluminosiloxane compound is preferably used.

The aluminosiloxane compound is, for example, a compound represented by the following formula:

$[\text{Al}(OR^4)_2(OSiR^5{}_3)]_m$, $[\text{Al}(OR^6)(OSiR^7{}_3)_2]_p$, or $[\text{Al}(OSiR^8{}_3)_3]_2$.

In the above formulas, $R^4$ to $R^8$ are each independently an alkyl group of 1 to 12 carbon atoms or an aryl group of 6 to 12 carbon atoms, and m and p are each an integer of 2 or greater. In the above formulas, $R^4$ and $R^6$ are each preferably at least one group selected from the group consisting of ethyl, propyl, isopropyl and t-butyl. $R^5$, $R^7$ and $R^8$ are each preferably at least one group selected from the group consisting of methyl, ethyl, propyl, isopropyl, t-butyl and phenyl.

In the present invention, an aluminosiloxane compound having an Al:Si molar ratio of 1:1, 1:2 or 1:3 is preferably used as the organosilicon aluminum compound (c-2).

The compound represented by the formula $[\text{Al}(OR^4)_2(OSiR^5{}_3)]_m$ has an Al:Si molar ratio of 1:1, and examples of such compounds include those represented by the following formulas. In this specification, a methyl group and an isopropyl group are sometimes represented by "Me" and "$^i$Pr", respectively.

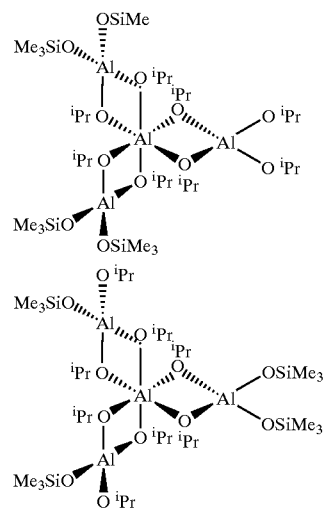

The compound represented by the formula $[\text{Al}(OR^6)(OSiR^7{}_3)_2]_p$ has an Al:Si molar ratio of 1:2, and examples of such compounds include those represented by the following formulas.

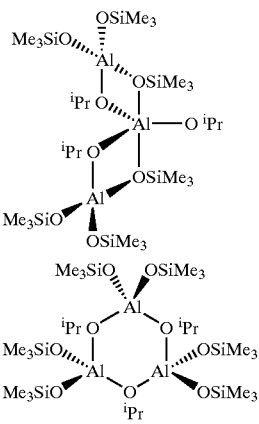

The compound represented by the formula $[Al(OSiR^8_3)_3]_2$ has an Al:Si molar ratio of 1:3, and examples of such compounds include those represented by the following formula.

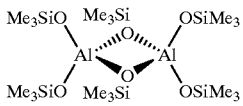

The aluminosiloxane compound may be prepared by any process, and can be prepared by, for example, the method described in, for example, K. Forting, W. E. Streib, K. G. Caulton, O. Poncelet & L. G. Hubert-Pfalzgret, Polyhedron, 10(14), 1639–1646 (1991). The structure of the aluminosiloxane compound thus prepared can be identified by IR and $^1$H-NMR.

For example, the aluminosiloxane of the formula $[Al(O^iPr)_2(OSiMe_3)]_m$ employable in the invention has the following spectral information.

IR (cm$^{-1}$): 1250 (Si—C); –1180, 1130 (C—CH$_3$); 1170; 950 (Si—O); 760; 640 (Al—OR)

$^1$H-NMR (CDCl$^3$, 0.1M, 25° C.) (ppm): 4.47–4.08 (m, OCHMe$_2$, 2H); 1.42; 1.27; 1.47; 1.36; 1.21; 1.10; 1.06 (d, J=6 Hz, OCHMe$_2$, 12H); 0.25, 0.22, 0.21 (s, OSiMe$_2$, 9H)

(d) Another Electron Donor

The solid titanium catalyst component for use in the invention may contain another electron donor (d) if necessary, in addition to the liquid magnesium compound (a), the liquid titanium compound (b) and the organosilicon compound or the organosilicon aluminum compound (c).

Examples of the electron donors (d) include organic acid esters, organic acid halides, organic acid anhydrides, ethers, ketones, tertiary amines, phosphorous acid esters, phosphoric acid esters, carboxylic acid amides, nitriles, aliphatic carbonates and pyridines.

More specifically, there can be mentioned:

organic acid esters of 2 to 18 carbon atoms, such as methyl formate, methyl acetate, ethyl acetate, vinyl acetate, propyl acetate, i-butyl acetate, t-butyl acetate, octyl acetate, cyclohexyl acetate, methyl chloroacetate, ethyl dichloroacetate, ethyl propionate, ethyl pyruvate, ethyl pivalate, methyl butyrate, ethyl valerate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate and ethyl ethoxybenzoate;

acid halides of 2 to 15 carbon atoms, such as acetyl chloride, benzoyl chloride and toluyl chloride;

acid anhydrides, such as acetic anhydride, phthalic anhydride, maleic anhydride, benzoic anhydride, trimellitic anhydride and tetrahydrophthalic anhydride;

ethers of 2 to 20 carbon atoms, such as methyl ether, ethyl ether, isopropyl ether, butyl ether, amyl ether, tetrahydrofuran, ethyl benzyl ether, ethylene glycol dibutyl ether, anisole and diphenyl ether;

ketones of 3 to 20 carbon atoms, such as acetone, methyl ethyl ketone, methyl isobutyl ketone, ethyl-n-butyl ketone, acetophenone, benzophenone, benzoquinone and cyclohexanone;

tertiary amines, such as trimethylamine, triethylamine, tributylamine, tribenzylamine and tetramethylethylenediamine;

phosphorous acid esters, such as trimethyl phosphite, triethyl phosphite, tri-n-propyl phosphite, triisopropyl phosphite, tri-n-butyl phosphite, triisobutyl phosphite, diethyl-n-butyl phosphite and diethylphenyl phosphite;

phosphoric acid esters, such as trimethyl phosphate, triphenyl phosphate and tritolyl phosphate;

acid amides, such as N,N-dimethylacetamide, N,N-diethylbenzamide and N,N-dimethyltoluamide;

nitriles, such as acetonitrile, benzonitrile and tolunitrile;

aliphatic carbonates, such as dimethyl carbonate, diethyl carbonate and ethylene carbonate; and pyridines, such as pyridine, methylpyridine, ethylpyridine and dimethylpyridine.

These compounds can be used in combination of two or more kinds.

Preparation of Solid Titanium Catalyst Component (A)

The solid titanium catalyst component (A) for use in the invention can be prepared from the above components by, for example, the following process (1) or (2).

(1) The liquid magnesium compound (a) is contacted with the liquid titanium compound (b) in the presence of the organosilicon compound or the organosilicon aluminum compound (c) (sometimes referred to as "organosilicon compound (c)" simply hereinafter) in an amount of 0.25 to 0.35 mol based on 1 mol of the magnesium compound (a), and the resulting contact product is heated to a temperature of 90 to 115° C. and maintained at this temperature.

(2) The contact product prepared in the same manner as in the process (1) is maintained at a temperature of 90 to 115° C., and in this course, the organosilicon compound (c) is further added in an amount of not more than 0.5 mol based on 1 mol of the magnesium compound (a) between the time of a temperature lower by 10° C. than the temperature maintained and the time of completion of the temperature rise, or after completion of the temperature rise, and contacted with the contact product.

Of the above processes, the process (1) is preferably used in the preparation of the solid titanium catalyst component (A) from the viewpoint of catalytic activity of the resulting solid titanium catalyst component.

For contacting the components in the above processes, the organosilicon compound (c) is desirably used in the amount specified as above based on the liquid magnesium compound (a). The liquid titanium compound (b) is desirably used in such a sufficient amount that a solid can be precipitated by the contact even if any special precipitating means is not used. Although the amount of the liquid titanium compound (b) used varies depending upon the type thereof, contact conditions, amount of the organosilicon compound (c), etc., it is usually not less than about 1 mol, preferably about 5 to about 200 mol, particularly preferably about 10 to about 100 mol, based on 1 mol of the liquid magnesium compound (a). The titanium compound (b) is used in an amount of preferably more than 1 mol, particularly preferably not less than 5 mol, based on 1 mol of the organosilicon compound (c).

The process for preparing the solid titanium catalyst component (A) is described below in more detail.

The liquid magnesium compound (a) and/or the titanium compound (b) used for preparing the solid titanium catalyst component (A) may contain the organosilicon compound (c). In this case, it is unnecessary to newly add the organosilicon compound (c) in the contact of the magnesium compound (a) with the titanium compound (b), however, the organosilicon compound (c) may be added if in either case the whole amount of the organosilicon compound (c) based on the magnesium compound (a) is in the above range.

The liquid magnesium compound (a) containing the organosilicon compound (c) is obtained by, for example, contacting the organosilicon compound (c) with the liquid magnesium compound (a) for a given period of time. The contact time (t) is as follows. When the contact temperature (Temp) is not higher than 55° C., the contact time is a time satisfying the condition of t>(3-(Temp-50)/5) hour(s), preferably t>(4-(Temp-50)/5) hour(s). When the contact temperature exceeds 55° C., the contact time is at least 1 hour, preferably not less than 2 hours. The contact temperature is in the range of usually 20 to 100° C., preferably higher than 55° C. and not higher than 90° C.

In the process (1) for preparing the solid titanium catalyst component (A), the contact of the liquid magnesium compound (a) with the liquid titanium compound (b) is carried out in the presence of the organosilicon compound (c) at a low temperature at which a solid is not produced rapidly, and is desirably carried out at a temperature of specifically −70 to +50° C., preferably −50 to +30° C., more preferably −40 to +20° C. The temperatures of the solutions used for the contact may be different from each other. If the contact temperature at the beginning of the contact is too low to precipitate a solid in the contact product, low-temperature contact may be conducted for a long period of time to precipitate a solid.

In the process (1), the contact product obtained above is then slowly heated to a temperature of 90 to 115° C. to slowly precipitate a solid and maintained at this temperature. The period of time for maintaining the temperature is in the range of usually 0.5 to 6 hours, preferably about 1 to 4 hours. The period of time necessary for the temperature rise greatly varies depending upon the scale of the reactor, etc.

By the contact of the liquid magnesium compound (a) with the liquid titanium compound (b) in the presence of the organosilicon compound (c) under the above conditions, a granular or spherical solid titanium catalyst component having an excellent particle size distribution can be obtained. When ethylene is subjected to slurry polymerization using such a solid titanium catalyst component of excellent particle morphology, a granular or spherical ethylene polymer having an excellent particle size distribution, high bulk density and excellent fluidity can be obtained.

In the process (2) for preparing the solid titanium catalyst component (A), the contact product is heated to a temperature of 90 to 115° C. and maintained at this temperature for usually 0.5 to 6 hours, preferably 1 to 4 hours, similarly to the process (1). In this course, however, the organosilicon compound (c) in an amount of not more than 0.5 mol based on 1 mol of the magnesium compound (a) is further added to the contact product between the time when a temperature is lower by 10° C. than the temperature maintained and the time when the temperature rise is completed, or after the temperature rise is completed (preferably immediately after the temperature rise).

The solid titanium catalyst component (A) prepared as above contains magnesium, titanium, a halogen and the organosilicon compound (c). In the solid titanium catalyst component (A), the magnesium/titanium atomic ratio is in the range of about 2 to about 100, preferably about 4 to about 50, more preferably about 5 to about 30, and when the organosilicon compound (c-1) is used, the magnesium/titanium molar ratio is in the range of 3.0 to 4.0, preferably 3.1 to 3.8, more preferably 3.2 to 3.7. The titanium atom is desirably contained in an amount of not less than 7.8% by weight, preferably not less than 8.0% by weight. The halogen/titanium atomic ratio is desired to be in the range of about 4 to about 100, preferably about 5 to about 90, more preferably about 8 to about 50, and the organosilicon compound (c)/titanium molar ratio is desired to be in the range of about 0.01 to about 100, preferably about 0.1 to about 10, more preferably about 0.2 to about 6.

The organosilicon compound (c)/magnesium molar ratio is desired to be in the range of about 0.001 to about 0.1, preferably about 0.002 to about 0.08, particularly preferably 0.005 to 0.05.

The solid titanium catalyst component (A) for use in the invention may further contain other additives, such as a carrier, in addition to the above components. When the carrier is used, the carrier may be contained in an amount of not more than 500% by weight, preferably not more than 400% by weight, more preferably not more than 300% by weight, still more preferably not more than 200% by weight, based on the catalyst component. The composition of the solid titanium catalyst component can be measured by ICP (Inductively Coupled Plasma-Atomic Emission Spectroscopy), gas chromatography or the like, after the solid titanium catalyst component is sufficiently washed with a large amount of hexane and dried under the conditions of 0.1 to 1 Torr and room temperature for not less than 2 hours.

The shape of the solid titanium catalyst component (A) for use in the invention is desired to be granular or almost spherical, and the specific surface area thereof is not less than about 10 $m^2/g$, preferably about 30 to 500 $m^2/g$. In the present invention, the solid titanium catalyst component is usually used after washed with a hydrocarbon solvent.

Ethylene Polymerization Catalyst

In the present invention, an ethylene polymerization catalyst containing the above-described solid titanium catalyst component (A) is employed.

As the ethylene polymerization catalyst for use in the invention, a catalyst formed from the solid titanium catalyst component (A) and an organometallic compound (B) is preferably employed. The organometallic compound capable of forming the ethylene polymerization catalyst for use in the invention is preferably one containing a metal selected from Group 1, Group 2 and Group 13 of the periodic table, and examples of such compounds include an organoaluminum compound, an alkyl complex salt of a Group 1 metal and aluminum, and an organometallic compound of a Group 2 metal.

The organoaluminum compound is, for example, an organoaluminum compound represented by the following formula:

$$R^a{}_n AlX_{3-n}$$

wherein $R^a$ is a hydrocarbon group of 1 to 12 carbon atoms, X is a halogen or hydrogen, and n is 1 to 3.

In the above formula, $R^a$ is a hydrocarbon group of 1 to 12 carbon atoms, such as an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound is a compound represented by the following formula.

$$R^a{}_n AlY_{3-n}$$

In the above formula, $R^a$ is the same as above, Y is —$OR^b$ group, —$OSiR^c{}_3$ group, —$OAlR^d{}_2$ group, —$NR^e{}_2$ group, —$SiR^f{}_3$ group or —$N(R^g)AlR^h{}_2$ group, and n is 1 to 2. $R^b$, $R^c$, $R^d$ and $R^h$ are each independently a hydrocarbon group, such as methyl, ethyl, isopropyl, isobutyl, cyclohexyl or phenyl, $R^e$ is hydrogen, methyl, ethyl, isopropyl, phenyl, trimethylsilyl or the like, and $R^f$ and $R^g$ are each methyl, ethyl or the like.

Examples of such organoaluminum compounds include the following compounds:

(1) compounds represented by $R^a{}_n Al(OR^b)_{3-n}$, such as dimethylaluminum methoxide, diethylaluminum ethoxide and diisobutylaluminum methoxide;

(2) compounds represented by $R^a{}_n Al(OSiR^c{}_3)_{3-n}$, such as $Et_2Al(OSiMe_3)$, $(iso-Bu)_2Al(OSiMe_3)$ and $(iso-Bu)_2Al(OSiEt_3)$;

(3) compounds represented by $R^a{}_n Al(OAlR^d{}_2)_{3-n}$, such as $Et_2AlOAlEt_2$ and $(iso-Bu)_2AlOAl(iso-Bu)_2$;

(4) compounds represented by $R^a{}_n Al(NR^e{}_2)_{3-n}$, such as $Me_2AlNEt_2$, $Et_2AlNHMe$, $Me_2AlNHEt$, $Et_2AlN(Me_3Si)_2$ and $(iso-Bu)_2AlN(Me_3Si)_2$;

(5) compounds represented by $R^a{}_n Al(SiR^f{}_3)_{3-n}$, such as $(iso-Bu)_2AlSiMe_3$; and (6) compounds represented by $R^a{}_n Al[N(R^g)—AlR^h{}_2]_{3-n}$, such as $Et_2AlN(Me)—AlEt_2$ and $(iso-Bu)_2AlN(Et)Al(iso-Bu)_2$.

Also available are compounds analogous to the above compounds, such as organoaluminum compounds wherein two or more aluminum atoms are bonded through an oxygen atom or a nitrogen atom. Examples of such compounds include $(C_2H_5)_2AlOAl(C_2H_5)_2$, $(C_4H_9)_2AlOAl(C_4H_9)_2$ and $(C_2H_5)_2AlN(C_2H_5)Al(C_2H_5)_2$. Aluminoxanes, such as methylaluminoxane, are also available.

The alkyl complex salt of a Group 1 metal and aluminum is, for example, a compound represented by the following formula:

$$M^1 AlR^j{}_4$$

wherein $M^1$ is Li, Na or K, and $R^j$ is a hydrocarbon group of 1 to 15 carbon atoms.

Examples of such compounds include $LiAl(C_2H_5)_4$ and $LiAl(C_7H_{15})_4$.

The organometallic compound of a Group 2 metal is, for example, a compound represented by the following formula:

$$R^k R^l M^2$$

wherein $R^k$ and $R^l$ are each a hydrocarbon group of 1 to 15 carbon atoms or a halogen, they may be the same or different except that each of them is a halogen, and $M^2$ is Mg, Zn or Cd.

Examples of such compounds include diethylzinc, diethylmagnesium, butylethylmagnesium, ethylmagnesium chloride and butylmagnesium chloride.

Of the organometallic compounds mentioned above, compounds represented by $R^a{}_3 AlX_{3-n}$, $R^a{}_n Al(OR^b)_{3-n}$ and $R^a{}_n Al(OAlR^d{}_2)_{3-n}$, particularly trialkylaluminums, are preferably employed. These compounds can be used in combination of two or more kinds.

Onto the ethylene polymerization catalyst for use in the invention, olefins may be prepolymerized. The ethylene polymerization catalyst for use in the invention may further contain other components useful for ethylene polymerization in addition to the above components.

The ethylene polymerization catalyst for use in the invention exhibits extremely high activity in the polymerization or copolymerization of ethylene.

Polymerization

In the present invention, using the catalyst containing the solid titanium catalyst component (A), ethylene is polymerized singly or ethylene and another α-olefin are copolymerized to prepare an ethylene polymer composition. The polymerization can be carried out by any of batchwise, semi-continuous and continuous processes. It is preferable to polymerize ethylene singly or copolymerize ethylene and another α-olefin in plural steps including the following steps (I) and (II) to prepare an ethylene polymer composition.

The olefin other than ethylene that is used in the copolymerization of ethylene and another α-olefin is, for example, an α-olefin of 3 to 20 carbon atoms. Examples of such α-olefins include straight-chain or branched α-olefins, such as propylene, 1-butene, 1-pentene, 1-hexene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene and 1-eicosene. These α-olefins may be used singly or in combination of two or more kinds.

In the polymerization in the present invention, small amounts of other unsaturated compounds, such as vinyl compounds, cycloolefins and polyene compounds, can be copolymerized. For example, there can be copolymerized aromatic vinyl compounds, such as styrene, substituted styrenes, allylbenzene, substituted allylbenzenes, vinylnaphthalenes, substituted vinylnaphthalenes, allylnaphthalenes and substituted allylnaphathalenes; alicyclic vinyl compounds, such as vinylcyclopentane, substituted vinylcyclopentanes, vinylcyclohexane, substituted vinylcyclohexanes, vinylcycloheptane, substituted vinylcycloheptanes and allylnorbornane; cycloolefins, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene; and silane unsaturated compounds, such as allyltrimethylsilane, allyltriethylsilane, 4-trimethylsilyl-1-butene, 6-trimethylsilyl-1-hexene, 8-trimethylsilyl-1-octene and 10-trimethylsilyl-1-decene.

The step (I) is a step to homopolymerize ethylene or copolymerize ethylene and another α-olefin using the catalyst containing the solid titanium catalyst component (A), and is a step to prepare an ethylene polymer (i) having an α-olefin content of not more than 30% by weight, preferably 0 to 20% by weight, more preferably 0 to 10% by weight, and an intrinsic viscosity [η] of at least 1.5 times, preferably not less than 2 times, more preferably 3 to 20 times, the intrinsic viscosity of an ethylene polymer (ii) obtained in the later-described step (II), and ranging from 1 to 12 dl/g, preferably from 1.5 to 12 dl/g, more preferably from 2 to 10 dl/g.

When the ethylene copolymer composition is applied to film use, the intrinsic viscosity [η] of the ethylene polymer (i) is desired to be in the range of 5 to 20 times, preferably 7 to 15 times, the intrinsic viscosity [η] of the ethylene polymer (ii). The intrintrinsic viscosity [η] used herein is measured in decalin at 135° C., an is expressed by dl/g.

The upper limit of the intrinsic viscosity [η] of the ethylene polymer (i) is not specifically restricted as long as the intrinsic viscosity [η] of the ethylene polymer (i) is at least 1.5 times the intrinsic viscosity [η] of the ethylene polymer (ii) and the polymerization is feasible, but the upper limit is desired to be usually not more than 50 times.

The step (II) is a step to homopolymerize ethylene or copolymerize ethylene and another α-olefin, and is a step to prepare an ethylene polymer (ii) having an α-olefin content of not more than 15% by weight, preferably 0 to 10% by weight, more preferably 0 to 5% by weight, and an intrinsic viscosity [η] of 0.3 to 3 dl/g, preferably 0.4 to 2.5 dl/g, preferably from 0.5 to 2 dl/g.

When the α-olefin content of the ethylene polymer (ii) is in the above range, a composition having excellent resistance to environmental stress crack is obtained, so that the above range is preferable. When the intrinsic viscosity [η] of the ethylene polymer (II) is in the above range, a composition having excellent processability, impact strength and tensile strength is obtained, and a molded article having little surface roughening can be produced, so that the above range is preferable.

In the present invention, the step (II) is carried out in the presence of the ethylene polymer (i) obtained in the step (I), or the step (I) is carried out in the presence of the ethylene polymer (ii) obtained in the step (II). In this process, in the step (latter step) that is carried out in the presence of the ethylene polymer obtained in the former step, the aforesaid ethylene polymerization catalyst may be newly added, but it is preferable to continuously use the ethylene polymerization catalyst used in the former step. When the ethylene polymerization catalyst used in the former step is continuously used, the amount of the catalyst can be decreased, and a composition having less fish-eye can be obtained, so that such use is preferable.

In the present invention, an ethylene polymer is produced in the latter step in the presence of the ethylene polymer obtained in the former step, whereby an ethylene polymer composition is prepared. The intrinsic viscosity $[\eta]_B$ of the ethylene polymer produced in the latter step can be determined by the following formula:

$$[\eta]_C = W_A[\eta]_A + W_B[\eta]_B$$

wherein $[\eta]_A$ is an intrinsic viscosity of the ethylene polymer obtained in the former step, $[\eta]_B$ is an intrinsic viscosity obtained in the latter step, $[\eta]C$ is an intrinsic viscosity of the ethylene polymer composition, $W_A$ is a weight ratio of the ethylene polymer obtained in the former step to the ethylene polymer composition, $W_B$ is a weight ratio of the ethylene polymer obtained in the latter step to the ethylene polymer composition, and $W_A + W_B = 1$.

Although the polymerization in the step (I) and the step (II) may be any of slurry polymerization and gas phase polymerization, the slurry polymerization is preferable. The polymerization in the step (I) and the step (II) may be carried out in the presence of an inert solvent. Examples of the inert solvents employable in the polymerization include aliphatic hydrocarbons, such as butane, pentane, hexane, heptane, octane, decane, dodecane and kerosine; alicyclic hydrocarbons, such as cyclopentane, methylcyclopentane, cyclohexane and methylcyclohexane; aromatic hydrocarbons, such as benzene, toluene, xylene and ethylbenzene; and halogenated hydrocarbons, such as ethylene chloride and chlorobenzene.

In the step (I) and the step (II) in the invention, the ethylene polymerization catalyst is desirably used in an amount of usually 0.0001 to 0.1 mmol, preferably 0.001 to 0.05 mmol, in terms of Ti atom, based on 1 liter of the polymerization volume.

Although the polymerization conditions in the step (I) and the step (II) are not specifically restricted, these steps are desirably carried out under the conditions of a temperature of usually about 20 to 120° C., preferably 50 to 100° C., and a pressure of atmospheric pressure to 9.8 MPa (atmospheric pressure to 100 kg/cm$^2$), preferably about 0.2 to 4.9 MPa (about 2 to 50 kg/cm$^2$). When the organometallic compound (B) is used in combination, this compound (B) is used in such an amount that the amount of the metal atom in the organometallic compound (B) becomes usually 1 to 2000 mol based on 1 mol of the titanium atom in the solid titanium catalyst component (A).

In the step (I) and the step (II), the polymerization can be carried out in the presence of hydrogen to control the molecular weight of the resulting polymer.

The ethylene polymer composition obtained in the invention contains the ethylene polymer (i) obtained in the step (I) and the ethylene polymer (ii) obtained in the step (II).

In the present invention, the step (I) and the step (II) are desirably carried out in such a manner that the amount of the ethylene polymer (i) obtained in the step (I) becomes 40 to 70 parts by weight, preferably 45 to 60 parts by weight, and the amount of the ethylene polymer (ii) obtained in the step (II) becomes 60 to 30 parts by weight, preferably 55 to 40 parts by weight, each amount being based on 100 parts by weight of the resulting whole ethylene polymer composition.

By the process for preparing an ethylene polymer composition having the step (I) and the step (II) according to the invention, an ethylene polymer composition having an intrinsic viscosity [η] of 1 to 6 dl/g, preferably 1.5 to 5 dl/g, and a density of not less than 0.94 g/cm$^3$, preferably 0.94 to 0.97 g/cm$^3$, more preferably 0.95 to 0.97 g/cm$^3$, is obtained.

The α-olefin content in the ethylene polymer composition obtained by the invention is desired to be not more than 20% by weight, preferably 0 to 10% by weight. The molecular weight distribution (Mw/Mn) of the ethylene polymer composition obtained by the invention is relatively wide owing to the multi-step polymerization and is desired to be in the range of usually 20 to 45, preferably about 25 to 40.

The process for preparing an ethylene polymer composition according to the invention may further has, in addition to the step (I) and the step (II), a drying step for drying the resulting ethylene polymer composition at a temperature of about 50 to 110° C., preferably about 70 to 110° C. The ethylene polymer composition obtained by the invention has a high sintering temperature, and even if the composition is subjected to drying accompanied by heating, surface tackiness hardly occurs. Moreover, local overheating hardly takes place owing to the excellent particle size distribution. Hence, drying of the ethylene polymer composition can be efficiently carried out.

If the homopolymerization of ethylene or copolymerization of ethylene and another α-olefin using a catalyst containing the solid titanium catalyst component (A) is carried out in one step without dividing it into two steps, the resulting polymer has a bulk specific gravity of usually 0.30 to 0.45 g/ml, preferably 0.33 to 0.45 g/ml.

The melt flow rate (in accordance with ASTM D 1238E, 190° C.) of the ethylene polymer obtained in the one-step polymerization is desired to be in the range of 0.01 to 5000 g/10 min.

In the process for preparing an ethylene polymer composition according to the invention, an ethylene polymer composition can be prepared with extremely high polymerization activity, and obtainable is an ethylene polymer composition having excellent particle morphology. On this account, the ethylene polymer composition has a low catalyst content per unit of the polymer composition, and mold rusting hardly occurs in the molding process. In addition, the ethylene polymer composition obtained by the invention has a narrow particle size distribution and a relatively wide molecular weight distribution, and hence the composition has excellent moldability and scarcely has tackiness even under such high-temperature conditions as in the molding process.

Particles of Ethylene Polymer Composition

The particles of ethylene polymer composition according to the invention comprise an ethylene polymer composition obtained by homopolymerizing ethylene or copolymerizing ethylene and another α-olefin and having a melt flow rate, as measured at 190° C. in accordance with ASTM D 1238E, of 0.0001 to 0.5 g/10 min, preferably 0.0005 to 0.3 g/10 min, and a molecular weight distribution (Mw/Mn) of 20 to 45, preferably 25 to 40. The ethylene polymer composition desirably has an intrinsic viscosity [η] of 1 to 6 dl/g, preferably 1.5 to 5 dl/g, a density of not less than 0.94 g/cm$^3$, preferably 0.94 to 0.97 g/cm$^3$, more preferably about 0.95 to 0.97 g/cm$^3$, and an α-olefin content of not more than 20% by weight, preferably 0 to 10% by weight.

The particles of the ethylene polymer composition of the invention have:

a particle size distribution index, as determined by the following formula, of 1.1 to 2.0, preferably 1.1 to 1.8, more preferably 1.1 to 1.6, $$\text{Particle size distribution index} = \sqrt{\text{Polymer } D_{84}/\text{Polymer } D_{16}}$$

wherein Polymer $D_{16}$ is a particle diameter obtained when 16% by weight of the whole particles of ethylene polymer composition can be sieved, and Polymer $D_{84}$ is a particle diameter obtained when 84% by weight of the whole particles of ethylene polymer composition can be sieved, a bulk density of 0.30 to 0.45 g/ml, preferably 0.32 to 0.45 g/ml, and a fluidity index of 45 to 90, preferably 50 to 90.

The molecular weight distribution (Mw/Mn) of the ethylene polymer composition can be determined by measuring molecular weights by GPC (gel permeation chromatography) under the conditions of columns of Tosoh GMHHR-H(S)-HT 30 cm×2 and GMH-HTL 30 cm×2, a solvent of orthodichlorobenzene, a flow rate of 1.0 ml/min and a temperature of 140° C.

The particle size distribution index of the particles of ethylene polymer composition can be determined in accordance with the above formula using a particle size distribution obtained by sieve analysis. The bulk density can be determined by JIS K 6721, and the fluidity index can be determined by measuring compressibility (%), angle of repose (degrees), angle of spatula (degrees) and uniformity coefficient in accordance with the method of Carr (Chemical Engineering, Jan. 18, 1965).

The particles of ethylene polymer composition of the invention can be preferably prepared by the aforesaid process for preparing an ethylene polymer composition according to the invention, and can be more preferably prepared by carrying out the polymerization of the step (I) and the step (II) as slurry polymerization in the aforesaid process for preparing an ethylene polymer composition according to the invention.

The particles of ethylene polymer composition of the invention comprise an ethylene polymer composition having a specific MFR and a relatively wide molecular weight distribution and have a narrow particle size distribution, a specific bulk density and a specific fluidity index, as described above.

Accordingly, the particles of ethylene polymer composition have a high sintering temperature, scarcely have tackiness even at such a high temperature as in the drying process and are almost free from adhesion to one another, so that they can be easily handled in various processes such as transportation, storage and introduction into a molding machine. Further, the particles of ethylene polymer composition scarcely contain a fine powder and have excellent particle morphology, so that they can be used as they are without pelletization. Moreover, the particles of ethylene polymer composition of the invention have excellent moldability. Hence, a molded article obtained by molding them exhibits excellent impact strength and tensile strength, has little surface roughening and hardly causes rusting of a mold.

As described above, the particles of ethylene polymer composition of the invention can industrially, extremely efficiently undergo subsequent processes, such as transportation, storage, introduction into a molding machine and molding, and the molded product obtained from the particles has excellent properties.

To the ethylene polymer composition and the particles of ethylene polymer composition obtained by the invention, additives, such as heat stabilizer, weathering stabilizer, antistatic agent, anti-blocking agent, lubricant, nucleating agent, pigment, dye and inorganic or organic filler, can be added when needed.

The ethylene polymer composition and the particles of ethylene polymer composition according to the invention have excellent moldability and can be molded by calendering, extrusion molding, injection molding, blow molding, press molding, stamping and the like.

In order to produce a sheet or a film from the ethylene polymer composition or the particles of ethylene polymer composition, for example, extrusion molding of the ethylene polymer composition (particles) is available. In the extrusion molding, hitherto known extrusion devices and molding conditions are adoptable. For example, using a single-screw extruder, a kneading extruder, a ram extruder or a gear extruder, a molten ethylene polymer composition is extruded from a T-die or the like to produce a sheet or a film (unstretched).

A stretched film is obtained by stretching the extruded sheet or film (unstretched) by, for example, tentering (lengthwise-widthwise stretching, widthwise-lengthwise stretching), simultaneous biaxial orientation or monoaxial stretching. Also an inflation film can be produced. The inflation film is produced by a process comprising melting the particles of ethylene polymer composition, extruding the molten resin through a circular slit die and inflating the extrudate with a prescribed air stream. The resin temperature in the extrusion of the molten particles of ethylene polymer composition is preferably in the range of 180 to 250° C. The height of the frost line from the die surface is preferably in the range of 8 to 15 times the die diameter. The blow up ratio is preferably in the range of 1.5 to 6 times.

The film that is produced from the particles of ethylene polymer composition of the invention as described above desirably has a thickness of 5 to 60 $\mu$m, preferably 6 to 50 $\mu$m.

The film obtained as above has features of small gauge-variation and excellent tear strength.

In the present invention, the expression "small gauge-variation" used herein means that a standard deviation value of film thickness at the space of 15 mm is not more than 1.5 $\mu$m measured by continuous film-thickness measuring apparatuses K-306A and K-310C (products of Anritsu Co.), and the expression "excellent tear strength" used herein means that Elmendorf tear strength measured in accordance with JIS K7128 is not less than 70 N/cm in the MD direction and not less than 700 N/cm in the TD direction.

EFFECT OF THE INVENTION

According to the invention, an ethylene polymer composition having a low content of fine powder, excellent particle morphology and excellent moldability, scarcely having tackiness even under such high-temperature conditions as in the drying or molding process and having excellent industrial-handling properties can be prepared with extremely high polymerization activity.

The particles of ethylene polymer composition of the invention scarcely have tackiness even when heated in the molding process or the like, are almost free from adhesion to one another and can be easily handled industrially. Further, the particles of ethylene polymer composition have excellent moldability and scarcely cause rusting of a mold. Moreover, the particles of ethylene polymer composition scarcely contain a fine powder, exhibit excellent particle morphology and can be molded as they are without pelletization. The molded article obtained by molding the particles of ethylene polymer composition of the invention has excellent impact strength and tensile strength and has little surface roughening. When the particles of ethylene polymer composition are applied to film use, the film has small gauge-variation and excellent tear strength.

The film of the invention is obtained from the particles of ethylene polymer composition and has small gauge-variation and excellent tear strength.

EXAMPLE

The present invention is further described with reference to the following examples, but it should be construed that the invention is in no way limited to those examples.

In the following examples, the composition of the solid titanium catalyst component, particle size distribution of the particles of ethylene polymer composition and bulk specific gravity thereof were measured by the methods described below.

Mg and Ti Contents

The Mg and Ti contents were measured by ICP analyzer (manufactured by Shimazu Seisakusho, ICPF 1000TR)

Cl Content

The Cl content was measured by silver nitrate titration.

Particle Size Distribution

The particle size distribution was measured by the use of a vibrating machine (manufactured by Iida Seisakusho, low-tap machine) and a sieve (Bunsei Furui, inner diameter: 200 mm).

Bulk Specific Gravity

The bulk specific gravity was measured by JIS K-6721.

Sintering Temperature

In a 1-liter glass autoclave, 100 g of a polymer composition and 250 ml of hexane were placed. After the autoclave was closed, the contents were stirred at a stirring rate of 300 rpm for 30 minutes. With heating at a rate of 1° C./min, the state of slurrying was observed to measure a temperature at which the composition swelled, and the measured temperature was taken as a sintering temperature.

Film Properties

Using continuous film-thickness measuring apparatuses K-306A and K-310C manufactured by Anritsu Co., a film thickness was measured at intervals of 15 mm, and a gauge-variation was determined by calculation. That is, a mean thickness and a standard deviation value of the film were measured by the above devices, and the standard deviation value was taken as a gauge-variation in film thickness. The Elmendorf tear strength was determined by carrying out a tear test in accordance with JIS K 7128.

Preparation of Solid Titanium Catalyst Component (A)

Synthesis Example 1

5.0 Kilograms (52.5 mol) of anhydrous magnesium chloride, 21.5 kg of decane and 17.1 kg (131.3 mol) of 2-ethylhexyl alcohol were heated and reacted at 140° C. for 8 hours to give a homogeneous solution. To the solution, 3.28 kg (15.8 mol) of tetraethoxysilane was added, and they were stirred at 60° C. for 2 hours to dissolve the tetraethoxysilane in the solution, whereby a homogeneous solution was obtained.

The whole amount of the homogeneous solution was cooled to 40° C., maintained at that temperature and dropwise added to 140 liters of titanium tetrachloride (maintained at 2° C.) over a period of 2 hours with stirring. After the dropwise addition was completed, the mixed solution was maintained at 2° C. for 1 hour, then heated to 105° C. over a period of 3 hours and maintained at that temperature for 1 hour with stirring to perform reaction.

After the one-hour reaction was completed, the resulting solids were separated by hot filtration, and the solids were sufficiently washed with hexane at 90° C. until no titanium compound liberated was detected in the washing liquid. Thus, a hexane suspension of a solid titanium catalyst component (A-1) was obtained. The composition of the solid titanium catalyst component (A-1) is set forth in Table 1.

Synthesis Example 2

In 50 liters of dehydrated and purified hexane, 1.90 kg (20 mol) of anhydrous magnesium chloride was suspended. To the suspension was dropwise added 5.57 kg (121 mol) of ethanol with stirring, and the reaction was carried out at 30° C. for 1 hour. To the reaction solution, 6.44 kg (53.4 mol) of diethylaluminum chloride was dropwise added at 30° C., and the mixture was stirred at that temperature for 2 hours. Then, 2.99 kg (157.6 mol) of titanium tetrachloride was added, and the system was heated to 80° C. and maintained at that temperature for 3 hours with stirring to perform reaction.

After the reaction, the resulting solids were separated and sufficiently washed with hexane at room temperature until no titanium compound liberated was detected in the washing liquid. Thus, a hexane suspension of a solid titanium catalyst component (A-2) was obtained. The composition of the solid titanium catalyst component (A-2) is set forth in Table 1.

Synthesis Example 3

4.76 Grams (50 mmol) of anhydrous magnesium chloride, 28.1 ml of decane and 16.3 g (125 mmol) of 2-ethylhexyl alcohol were heated and reacted at 130° C. for 3 hours to give a homogeneous solution. To the solution, 3.1 g (15 mmol) of tetraethoxysilane was added, and they were stirred at 60° C. for 2 hours to dissolve the tetraethoxysilane in the solution.

The whole amount of the resulting homogeneous solution was cooled to 40° C., maintained at that temperature and dropwise added to 200 ml (1.8 mol) of titanium tetrachloride (maintained at 2° C.) over a period of 1 hour with stirring. After the dropwise addition was completed, the mixed solution was maintained at 2° C. for 1 hour, then heated to 105° C. over a period of 3 hours and maintained at that temperature for 1 hour with stirring.

After the one-hour reaction was completed, the resulting solids were separated by hot filtration and sufficiently washed with decane at 90° C. and hexane until no titanium compound liberated was detected in the washing liquid. Thus, a hexane suspension of a solid titanium catalyst component (A-3) was obtained. The composition of the solid titanium catalyst component (A-3) is set forth in Table 1.

Synthesis Example 4

A catalyst component was prepared in the same manner as in Synthesis Example 3, except that the reaction temperature after the addition of tetraethoxysilane was changed to 65° C. from 60° C. in the preparation of the catalyst component. The composition of the resulting solid titanium catalyst component (A-4) is set forth in Table 1.

Synthesis Example 5

A catalyst component was prepared in the same manner as in Synthesis Example 3, except that the reaction temperature after the addition of tetraethoxysilane was changed to 70° C. from 60° C. in the preparation of the catalyst component. The composition of the resulting solid titanium catalyst component (A-5) is set forth in Table 1.

Synthesis Example 6

A catalyst component was prepared in the same manner as in Synthesis Example 3, except that the reaction temperature was changed to 110° C. from 105° C. and the reaction time was changed to 2 hours from 1 hour in the preparation of the catalyst component. The composition of the resulting solid titanium catalyst component (A-6) is set forth in Table 1.

Synthesis Example 7

A catalyst component was prepared in the same manner as in Synthesis Example 3, except that the reaction temperature was changed to 120° C. from 105° C. and the reaction time was changed to 2 hours from 1 hour in the preparation of the catalyst component. The composition of the resulting solid titanium catalyst component (A-7) is set forth in Table 1.

Synthesis Example 8

A catalyst component was prepared in the same manner as in Synthesis Example 3, except that the amount of the tetraethoxysilane added was changed to 1.7 g (8 mmol) from 3.1 g (15 mmol) in the preparation of the catalyst component. The composition of the resulting solid titanium catalyst component (A-8) is set forth in Table 1.

Synthesis Example 9

A catalyst component was prepared in the same manner as in Synthesis Example 3, except that the reaction temperature was changed to 125° C. from 105° C. in the preparation of the catalyst component. The composition of the resulting solid titanium catalyst component (A-9) is set forth in Table 1.

In the compositions of the solid catalyst components of Synthesis Examples 3 to 9 set forth in Table 1, the amount of silicon is in the range of about 0.1 to 0.5% by weight, and the residual component (other than Ti, Mg, OEt, OEH and Si) is a halogen.

TABLE 1

| | Catalyst compo- | Composition of catalyst (% by weight) | | | | | | |
|---|---|---|---|---|---|---|---|---|
| | nent | Ti | Mg | OEt [1] | OEH [2] | Cl | Si | Al |
| Synthesis Ex. 1 | A-1 | 8.5 | 14.0 | 2.7 | 4.2 | 67 | 0.3 | — |
| Synthesis Ex. 2 | A-2 | 5.3 | 16.0 | 9.9 | — | 65 | — | 1.7 |
| Synthesis Ex. 3 | A-3 | 8.2 | 14.0 | 2.4 | 7.0 | | | |
| Synthesis Ex. 4 | A-4 | 8.1 | 13.0 | 2.5 | 6.6 | | | |
| Synthesis Ex. 5 | A-5 | 8.0 | 13.0 | 2.6 | 7.3 | | | |
| Synthesis Ex. 6 | A-6 | 6.5 | 16.0 | 1 | 3.2 | | | |
| Synthesis Ex. 7 | A-7 | 6.0 | 17.0 | ≦0.1 | 2.5 | | | |
| Synthesis Ex. 8 | A-8 | 7.2 | 14.0 | 1.6 | 5.0 | | | |
| Synthesis Ex. 9 | A-9 | 6.2 | 17.0 | 1.2 | 3.1 | | | |

Notes:
[1] OEt: ethoxy group
[2] OEH: 2-ethylhexoxy group

Polymerization

Example 1

Using a continuous slurry polymerization apparatus, two-step polymerization was carried out in the following manner.

First, to a polymerization reactor of the first step, the solid titanium catalyst component (A-1) prepared in Synthesis Example 1 and triethylaluminum were continuously fed at rates of 3.8 mmol/hr (in terms of titanium atom) and 20 mmol/hr, respectively. To the polymerization reactor were further continuously fed ethylene at a rate of 14.1 kg/hr and hexane at a rate of 40 l/hr, and in order to maintain the gas composition constant, hydrogen and nitrogen were continuously fed together with ethylene under the conditions of a hydrogen/ethylene molar ratio of 10.3 and an ethylene concentration of 7% by mol, whereby homopolymerization of ethylene was carried out under the conditions of a total pressure of 0.52 MPa and a polymerization temperature of 85° C. The ethylene polymer in the polymerization solution obtained by the polymerization of the first step had MFR of 797 g/10 min, a sintering temperature of 105° C. and an intrinsic viscosity [η] of 0.52 dl/g.

Then, after removal of hydrogen from the polymerization solution obtained by the polymerization of the first step, the polymerization solution was transferred into a polymerization reactor of the second step. To the polymerization reactor of the second step were further continuously fed ethylene at a rate of 13.9 kg/hr, 1-butene at a rate of 0.29 kg/hr and hexane at a rate of 53 l/hr, and in order to maintain the gas composition constant, hydrogen and nitrogen were continuously fed together with ethylene and 1-butene under the conditions of a 1-butene/ethylene molar ratio of 0.141, a hydrogen/ethylene molar ratio of 0.109 and an ethylene concentration of 10.6% by mol, whereby polymerization of ethylene and 1-butene was carried out under the conditions of a total pressure of 0.27 MPa and a polymerization temperature of 80° C. in the presence of the polymerization solution obtained by the polymerization of the first step. The ethylene polymer (ethylene/1-butene copolymer) obtained by the polymerization of the second step had an intrinsic viscosity [η] of 5.21 dl/g and a 1-butene content of 4.1% by weight.

The resulting ethylene polymer composition had a density of 0.948 g/cm$^3$, a 1-butene content of 2.0% by weight, MFR of 0.079 g/10 min, a sintering temperature of 95° C. and an intrinsic viscosity [η] of 2.82 dl/g. The weight ratio between the ethylene polymer obtained by the polymerization of the first step and the ethylene polymer obtained by the polymerization of the second step was 51:49. The properties of the ethylene polymer composition are set forth in Table 2, Table 3 and Table 4.

Example 2

The same continuous slurry polymerization apparatus as used in Example 1 was used. To a polymerization reactor of the first step, the solid titanium catalyst component (A-1) prepared in Synthesis Example 1 and triethylaluminum were continuously fed at rates of 2.1 mmol/hr (in terms of titanium atom) and 30 mmol/hr, respectively. To the polymerization reactor were further continuously fed ethylene at a rate of 12 kg/hr and hexane at a rate of 40 l/hr, and in order to maintain the gas composition constant, hydrogen and nitrogen were continuously fed together with ethylene under the conditions of a hydrogen/ethylene molar ratio of 8.5 and an ethylene concentration of 8.9% by mol, whereby homopolymerization of ethylene was carried out under the conditions of a total pressure of 0.83 MPa and a polymerization temperature of 85° C. The ethylene polymer in the polymerization solution obtained by the polymerization of the first step had MFR of 855 g/10 min, a sintering temperature of 105° C. and an intrinsic viscosity [η] of 0.51 dl/g.

Then, after removal of hydrogen from the polymerization solution obtained by the polymerization of the first step, the polymerization solution was transferred into a polymerization reactor of the second step. To the polymerization reactor of the second step were further continuously fed ethylene at a rate of 11.5 kg/hr, 1-butene at a rate of 0.3 kg/hr and hexane at a rate of 53 l/hr, and in order to maintain the gas composition constant, hydrogen and nitrogen were continuously fed together with ethylene and 1-butene under the conditions of a 1-butene/ethylene molar ratio of 0.069, a hydrogen/ethylene molar ratio of 0.068 and an ethylene concentration of 20.2% by mol, whereby polymerization of ethylene and 1-butene was carried out under the conditions of a total pressure of 0.26 MPa and a polymerization temperature of 80° C. in the presence of the polymerization solution obtained by the polymerization of the first step. The ethylene polymer (ethylene/1-butene copolymer) obtained by the polymerization of the second step had an intrinsic viscosity [η] of 5.20 dl/g and a 1-butene content of 4.1% by weight.

The resulting ethylene polymer composition had a density of 0.948 g/cm$^3$, a 1-butene content of 2.0% by weight. MFR of 0.081 g/10 min, a sintering temperature of 95° C. and an intrinsic viscosity [η] of 2.81 dl/g. The weight ratio between the ethylene polymer obtained by the polymerization of the first step and the ethylene polymer obtained by the polymerization of the second step was 51:49. The properties of the ethylene polymer composition are set forth in Table 2, Table 3 and Table 4.

Comparative Example 1

The same continuous slurry polymerization apparatus as used in Example 1 was used. To a polymerization reactor of the first step, the solid titanium catalyst component (A-2) prepared in Synthesis Example 2 and triethylaluminum were continuously fed at rates of 4.2 mmol/hr (in terms of titanium atom) and 20 mmol/hr, respectively. To the polymerization reactor were further continuously fed ethylene at a rate of 14.1 kg/hr and hexane at a rate of 40 l/hr, and in order to maintain the gas composition constant, hydrogen and nitrogen were continuously fed together with ethylene under the conditions of a hydrogen/ethylene molar ratio of 11.4 and an ethylene concentration of 6.2% by mol, whereby homopolymerization of ethylene was carried out under the conditions of a total pressure of 0.51 MPa and a polymerization temperature of 85° C. The ethylene polymer in the polymerization solution obtained by the polymerization of the first step had MFR of 796 g/10 min, a sintering temperature of 102° C. and an intrinsic viscosity [η] of 0.52 dl/g.

Then, after removal of hydrogen from the polymerization solution obtained by the polymerization of the first step, the polymerization solution was transferred into a polymerization reactor of the second step. To the polymerization reactor of the second step were further continuously fed ethylene at a rate of 13.9 kg/hr, 1-butene at a rate of 0.27 kg/hr and hexane at a rate of 53 l/hr, and in order to maintain the gas composition constant, hydrogen and nitrogen were continuously fed together with ethylene and 1-butene under the conditions of a 1-butene/ethylene molar ratio of 0.194, a hydrogen/ethylene molar ratio of 0.122 and an ethylene concentration of 9.2% by mol, whereby polymerization of ethylene and 1butene was carried out under the conditions of a total pressure of 0.27 MPa and a polymerization temperature of 80° C. in the presence of the polymerization solution obtained by the polymerization of the first step. The ethylene polymer (ethylene/1-butene copolymer) obtained by the polymerization of the second step had an intrinsic viscosity [η] of 5.62 dl/g and a 1-butene content of 4.1% by weight.

The resulting ethylene polymer composition had a density of 0.948 g/cm$^3$, a 1-butene content of 2.0% by weight MFR of 0.063 g/10 min, a sintering temperature of 92° C. and an intrinsic viscosity [η] of 3.02 dl/g. The weight ratio between the ethylene polymer obtained by the polymerization of the first step and the ethylene polymer obtained by the polymerization of the second step was 51:49. The properties of the ethylene polymer composition are set forth in Table 2, Table 3 and Table 4.

Comparative Example 2

The same continuous slurry polymerization apparatus as used in Example 1 was used. To a polymerization reactor of the first step, the solid titanium catalyst component (A-2) prepared in Synthesis Example 2 and triethylaluminum were continuously fed at rates of 2.5 mmol/hr (in terms of titanium atom) and 40 mmol/hr, respectively. To the polymerization reactor were further continuously fed ethylene at a rate of 12 kg/hr and hexane at a rate of 40 l/hr, and in order to maintain the gas composition constant, hydrogen and nitrogen were continuously fed together with ethylene under the conditions of a hydrogen/ethylene molar ratio of 9.3 and an ethylene concentration of 8% by mol, whereby homopolymerization of ethylene was carried out under the conditions of a total pressure of 0.79 MPa and a polymerization temperature of 85° C. The ethylene polymer in the polymerization solution obtained by the polymerization of the first step had MFR of 836 g/10 min, a sintering temperature of 102° C. and an intrinsic viscosity [η] of 0.51 dl/g.

Then, after removal of hydrogen from the polymerization solution obtained by the polymerization of the first step, the polymerization solution was transferred into a polymerization reactor of the second step. To the polymerization reactor of the second step were further continuously fed ethylene at a rate of 11.5 kg/hr, 1-butene at a rate of 0.26 kg/hr and hexane at a rate of 53 l/hr, and in order to maintain the gas composition constant, hydrogen and nitrogen were continuously fed together with ethylene and 1-butene under the conditions of a 1-butene/ethylene molar ratio of 0.1, a hydrogen/ethylene molar ratio of 0.097 and an ethylene concentration of 17.1% by mol, whereby polymerization of ethylene and 1-butene was carried out under the conditions of a total pressure of 0.29 MPa and a polymerization temperature of 80° C. in the presence of the polymerization solution obtained by the polymerization of the first step. The ethylene polymer (ethylene/1-butene copolymer) obtained by the polymerization of the second step had an intrinsic viscosity [η] of 5.18 dl/g and a 1-butene content of 3.9% by weight.

The resulting ethylene polymer composition had a density of 0.949 g/cm³, a 1-butene content of 1.9% by weight, MFR of 0.083 g/10 min, a sintering temperature of 92° C. and an intrinsic viscosity [η] of 2.80 dl/g. The weight ratio between the ethylene polymer obtained by the polymerization of the first step and the ethylene polymer obtained by the polymerization of the second step was 51:49. The properties of the ethylene polymer composition are set forth in Table 2, Table 3 and Table 4.

TABLE 2

Results of polymerization

| | Catalytic Activity (g/g-catalyst) | MFR (g/10 min) | Bulk Specific gravity (g/ml) | Sintering temperature (° C.) First step/Second step | Mw/Mn |
|---|---|---|---|---|---|
| Ex. 1 | 10,500 | 0.079 | 0.41 | 105/95 | 26.5 |
| Ex. 2 | 16,500 | 0.081 | 0.40 | 105/95 | 28.9 |
| Comp. Ex. 1 | 5,100 | 0.063 | 0.41 | 102/92 | 31.2 |
| Comp. Ex. 2 | 8,300 | 0.083 | 0.41 | 102/92 | 31.6 |

TABLE 3

| | Particle size distribution (μm) (% by weight) | | | | | | | | Particle size distribution index |
|---|---|---|---|---|---|---|---|---|---|
| | >850 | >500 | >250 | >180 | >100 | >75 | >45 | 45> | |
| Ex. 1 | 0.2 | 0.4 | 0.2 | 2.3 | 54.3 | 26.2 | 14.7 | 1.8 | 1.4 |
| Ex. 2 | 0.4 | 0.4 | 0.6 | 6.3 | 63.6 | 17.4 | 9.6 | 1.7 | 1.4 |
| Comp. Ex. 1 | 5.5 | 6.5 | 14.2 | 11.9 | 13.8 | 15.0 | 23.4 | 9.8 | 2.8 |
| Comp. Ex. 2 | 2.5 | 6.1 | 11.8 | 8.1 | 17.6 | 13.5 | 30.5 | 9.9 | 2.5 |

TABLE 4

| | | Compressibility (%) | Angle of repose (degrees) | Angle of spatula (degrees) | Uniformity coefficient | Fluidity index (total of indexes) |
|---|---|---|---|---|---|---|
| Ex. 1 | Measured value | 24 | 41 | 61 | 1.8 | 70.5 |
| | Index | 16 | 17 | 14.5 | 23 | |
| Ex. 2 | Measured value | 22 | 42 | 62 | 1.8 | 67 |
| | Index | 16 | 16 | 12 | 23 | |
| Comp. Ex. | Measured value | 28 | 67 | 87 | 3.5 | 44 |
| | Index | 12 | 2 | 7 | 23 | |
| Comp. Ex. | Measured value | 31 | 70 | 90 | 2.9 | 40 |
| | Index | 10 | 2 | 5 | 23 | |

Reference Example 1

In a 1-liter autoclave, 500 ml of purified n-heptane was placed in a nitrogen atmosphere. Then, 0.5 mmol of triethylaluminum and 0.03 mmol (in terms of titanium atom) of a hexane suspension of the solid titanium catalyst component (A-3) obtained in Synthesis Example 3 were added. Thereafter, the temperature of the system was heated to 80° C., and hydrogen was fed so that the pressure became 0.5 MPa. Then, ethylene was continuously fed for 1.5 hours so that the total pressure became 0.6 MPa. The polymerization temperature was maintained at 80° C.

After the polymerization was completed, the resulting ethylene polymer was separated from the n-heptane solvent and dried.

After drying, 106.6 g of a powdery polymer was obtained. The powdery polymer had MFR of 71 g/10 min and an apparent bulk specific gravity of 0.35 g/ml.

The results are set forth in Table 6. The particle size distribution of the powdery polymer is set forth in Table 5.

TABLE 5

| Particle diameter | more than 850 μm | 850–500 μm | 500–250 μm | 250–180 μm | 180–100 μm | 100–75 μm | 75–45 μm | less than 45 μm |
|---|---|---|---|---|---|---|---|---|
| % by weight | 0.4 | 0.4 | 0.6 | 1.4 | 49.8 | 31.3 | 15.3 | 0.8 |

Reference Example 2

Polymerization was carried out in the same manner as in Reference Example 1, except that the solid titanium catalyst component (A-4) was used instead of the solid titanium catalyst component (A-3). The results are set forth in Table 6.

Reference Example 3

Polymerization was carried out in the same manner as in Reference Example 1, except that the solid titanium catalyst component (A-5) was used instead of the solid titanium catalyst component (A-3). The results are set forth in Table 6.

Reference Example 4

Polymerization was carried out in the same manner as in Reference Example 1, except that the solid titanium catalyst component (A-6) was used instead of the solid titanium catalyst component (A-3). The results are set forth in Table 6.

Reference Example 5

Polymerization was carried out in the same manner as in Reference Example 1, except that the solid titanium catalyst component (A-7) was used instead of the solid titanium catalyst component (A-3) The results are set forth in Table 6.

Reference Example 6

Polymerization was carried out in the same manner as in Reference Example 1, except that the solid titanium catalyst component (A-8) was used instead of the solid titanium catalyst component (A-3). The results are set forth in Table 6.

Reference Example 7

Polymerization was carried out in the same manner as in Reference Example 1, except that the solid titanium catalyst component (A-9) was used instead of the solid titanium catalyst component (A-3). The results are set forth in Table 6.

TABLE 6

| | Results of polymerization | | | | | |
|---|---|---|---|---|---|---|
| | Activity | | | Bulk specific | Particle size distribution (% by weight) | | |
| | (g-PE/g-calyst) | MFR (g/10 min) | gravity (g/ml) | >500 μm | 500–45 μm | <45 μm |
| Ref. Ex. 1 | 12,200 | 71 | 0.35 | 0.8 | 98.4 | 0.8 |
| Ref. Ex. 2 | 12,500 | 60 | 0.35 | 0.8 | 99.2 | 0.0 |
| Ref. Ex. 3 | 12,100 | 68 | 0.34 | 1.0 | 99.0 | 0.0 |
| Ref. Ex. 4 | 9,200 | 36 | 0.33 | 0.1 | 99.8 | 0.1 |
| Ref. Ex. 5 | 7,400 | 46 | 0.28 | 0.3 | 99.6 | 0.1 |
| Ref. Ex. 6 | 7,700 | 88 | 0.29 | 1.6 | 86.1 | 12.3 |
| Ref. Ex. 7 | 9,200 | 69 | 0.34 | 0.2 | 99.3 | 0.5 |

Molding Example 1

The particles of ethylene polymer composition obtained in Example 2 were extruded through a circular slit die and inflated with a prescribed air stream to obtain a film. The resin temperature in the extrusion of the ethylene resin composition was 210° C. The height of the frost line from the die surface was 13 times the die diameter, and the blow up ratio was 3 times.

The mean thickness, gauge-variation and Elmendorf tear strength (MD and TD) of the resulting film are set forth in Table 7.

Molding Comparative Example 1

A film was obtained in the same manner as in Molding Example 1, except that the particles of ethylene polymer composition obtained in Comparative Example 2 were used instead of the particles of ethylene polymer composition obtained in Example 2. The mean thickness, gauge-variation and Elmendorf tear strength (MD and TD) of the resulting film are set forth in Table 7.

TABLE 7

| | Film thickness | | Elmendorf tear strength (N/cm) | |
|---|---|---|---|---|
| | Mean thickness (μm) | Gauge-variation (μm) | MD | TD |
| Molding Ex. 1 | 20.2 | 1.4 | 71 | 810 |
| Molding Comp. Ex. 1 | 20.1 | 1.9 | 65 | 660 |

What is claimed is:

1. A process for preparing an ethylene polymer composition, comprising:
 (I) polymerizing ethylene or ethylene and another α-olefin to form an ethylene polymer (i) having an α-olefin content of not more than 30% by weight and an intrinsic viscosity [η] of at least 1.5 times the intrinsic viscosity of the following ethylene polymer (ii) and ranging from 1 to 12 dl/g, and (II) polymerizing ethylene or ethylene and another α-olefin to form an ethylene polymer (ii) having an α-olefin content of not more than 15% by weight and an intrinsic viscosity [η] of 0.3 to 3 dl/g, said steps (I) and (II) using an ethylene polymerization catalyst containing a solid titanium catalyst component obtained by contacting (a) a liquid magnesium compound with (b) a liquid titanium compound in the presence of (c) an organosilicon compound or an organosilicon aluminum compound, wherein the step (II) is carried out in the presence of the ethylene polymer (i) obtained in the step (I) or the step (I) is carried out in the presence of the ethylene polymer (ii) obtained in the step (II), to form an ethylene polymer composition having an intrinsic viscosity [η] of 1 to 6 dl/g and a density of not less than 0.94 g/cm$^3$.

2. The process as claimed in claim 1, wherein the step (I) and the step (II) are each carried out by slurry polymerization.

3. Particles of ethylene polymer composition obtained by the process of claim 1 or 2, comprising an ethylene polymer composition having a melt flow rate, as measured at 190° C. in accordance with ASTM D 1238E, of 0.0001 to 0.5 g/10 min and a molecular weight distribution (Mw/Mn) of 20 to 45, and having:

a particle size distribution index, as determined by the following formula, of 1.1 to 2.0, $$\text{Particle size distribution index} = \sqrt{\text{Polymer } D_{84}/\text{Polymer } D_{16}}$$

wherein Polymer $D_{16}$ is a particle diameter obtained when 16% by weight of the whole particles of ethylene polymer composition can be sieved, and Polymer $D_{84}$ is a particle diameter obtained when 84% by weight of the whole particles of ethylene polymer composition can be sieved, a bulk density of 0.30 to 0.45 g/ml, and a fluidity index of 45 to 90.

4. A film obtained from the particles of the ethylene polymer composition of claim 3.

* * * * *